United States Patent [19]

Roberts

[11] Patent Number: 4,693,118

[45] Date of Patent: Sep. 15, 1987

[54] PNEUMATIC TIRE LEAK DETECTOR

[76] Inventor: Simon Roberts, 30543 Shoreham, Southfield, Mich. 48076

[21] Appl. No.: 856,007

[22] Filed: Apr. 25, 1986

Related U.S. Application Data

[62] Division of Ser. No. 750,591, Jul. 1, 1985, Pat. No. 4,612,798.

[51] Int. Cl.$^4$ .............................................. G01M 3/04
[52] U.S. Cl. .......................................... 73/40.7; 73/49
[58] Field of Search ................................... 73/40.7, 49

[56] References Cited

U.S. PATENT DOCUMENTS

| | | | |
|---|---|---|---|
| 1,507,486 | 9/1924 | Jones | 73/49 |
| 2,153,419 | 4/1939 | Hoffman | 222/4 |
| 2,501,047 | 3/1950 | Gustafsson et al. | 406/136 |
| 2,991,629 | 7/1961 | Rose | 62/48 |
| 3,024,787 | 3/1962 | Birch et al. | 128/200.23 |
| 3,027,754 | 4/1962 | Alquist | 73/40.7 |
| 3,085,423 | 4/1963 | Champion | 73/40.7 |
| 3,483,736 | 12/1969 | Anderson | 73/40.7 |
| 3,515,181 | 6/1970 | Sperberg | 141/38 |
| 3,843,586 | 10/1974 | Wolf | 206/302 |
| 3,960,001 | 6/1976 | Hayes | 73/40.7 |
| 4,155,249 | 5/1979 | Scott | 73/40.7 |

Primary Examiner—Stewart J. Levy
Assistant Examiner—Hezron E. Williams
Attorney, Agent, or Firm—Rhodes and Boller

[57] ABSTRACT

An apparatus for detecting the location of a leak in a pneumatic tire. A leaking tire is filled with a suspension which is capable of flowing through a leak of the tire and staining the perimeter of the leak at the outside surface of the tire. The suspension is a powdered fluorescent pigment of small particle size suspended in a propellant and the air inside of the tire. A portable container is provided for storing the powdered pigment and propellant. The container has an outlet valve for controlling the release of the pigment and propellant from the container. One end of a flexible tube is connected to the outlet valve of the container and a fitting at the other end of the tube is connected to an inlet valve of the tire. The fitting has a means for sealing the attachment of the tube to the tire inlet valve and a means for opening the tire inlet valve. When the outlet valve of the container is opened, the pigment and propellant flow into the tire and combine with the air in the tire to form the suspension. The escape of the suspension through the leak deposits some of the powdered pigment on the perimeter of the leak which is easily seen for detecting the location of the leak.

9 Claims, 5 Drawing Figures

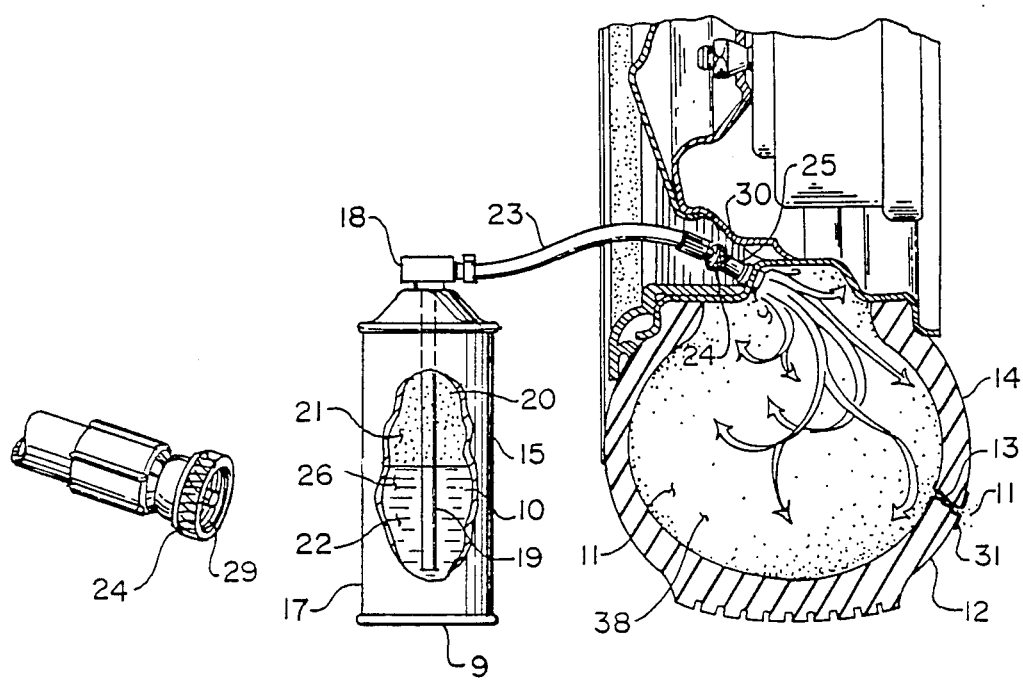
FIG. 3
FIG. 2
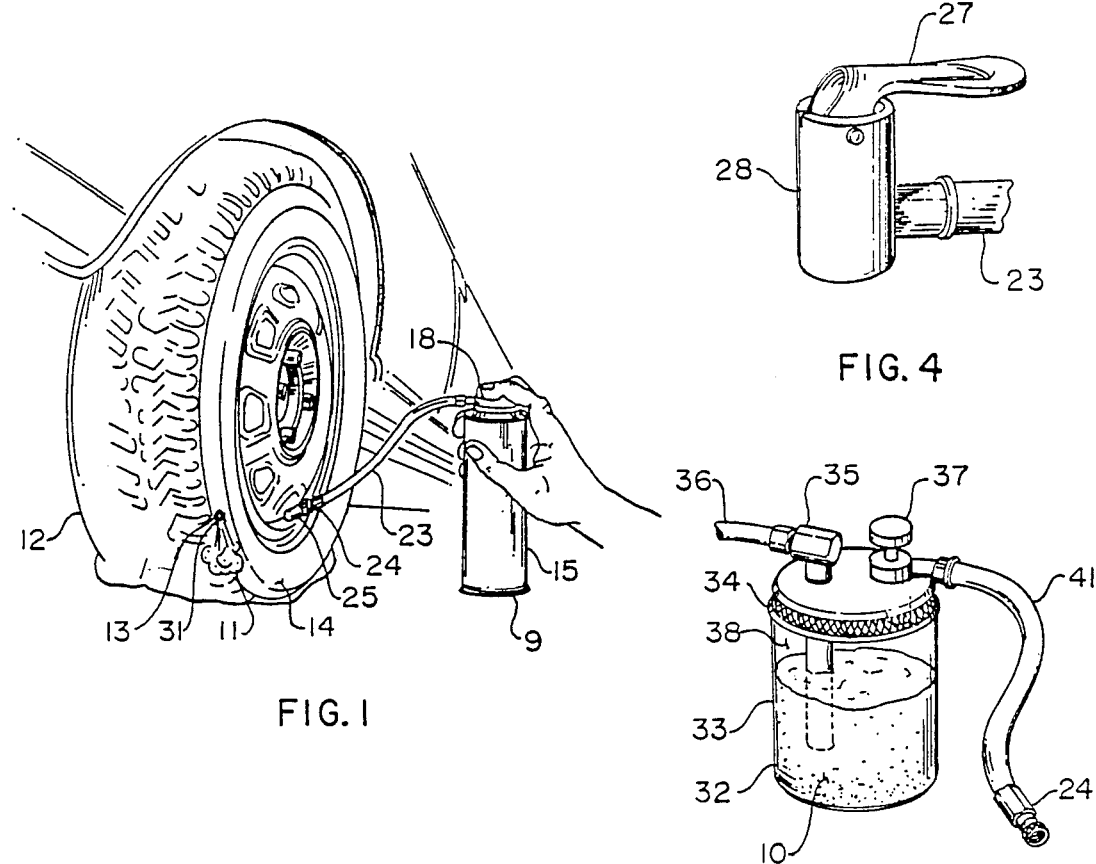
FIG. 4
FIG. 1
FIG. 5

PNEUMATIC TIRE LEAK DETECTOR

This is a division of application Ser. No. 06/750,591 filed July 1, 1985, now U.S. Pat. No. 4,612,798.

BACKGROUND OF THE INVENTION

The detection of large leaks in pneumatic tires is rarely a problem since the noise created by the escaping air leads one directly to the area of the leak. The detection of smaller leaks requires far more effort since the noise may be inaudible and the source of the leak nearly invisible with the naked eye. Tire leaks can occur from punctures, defective sealing at the tire/rim interface and defective tire inlet valves.

The usual procedure for detecting the location of leaks involves de-mounting a leaking tire from a vehicle, partially submerging the tire in a water tank and searching for bubbles caused by escaping air. This procedure is time consuming and especially frustrating since leaks from punctures are most common and tire punctures are commonly repaired with externally inserted elastomeric repair plugs—a process which does not require de-mounting punctured tires from their vehicles.

In view of the foregoing, a means for detecting small leaks in pneumatic tires without de-mounting and immersing them in water would save much labor and time. Such means would also make possible repairs in the field for even greater savings.

SUMMARY OF THE INVENTION

The present invention is related to tire repair and more particularly to an apparatus for detecting the locations of small leaks without de-mounting the tires from their vehicles and immersing them in water.

A powdered pigment and propellant are stored under pressure in a container commonly referred to as an "aerosol can". The container has a manually operable outlet valve and one end portion of a flexible tubular line connected to the outlet side of the valve. A fitting is connected to the other end portion of the flexible line and the fitting is adapted for connecting the line to the inlet valve of a tire. On manually opening the container outlet valve with the flexible line connected to a tire inlet valve, powdered pigment is injected under pressure by the propellant into the tire, filling it with an aerosol suspension comprising the powdered pigment suspended in the air and a propellant. The aerosol suspension escaping through the leak carries the powdered pigment to the outer surface of the tire and stains the perimeter of the leak on the outer surface of the tire, thereby providing a visual marking of the leak.

It is a primary object of the invention to provide an improved means of identifying the location of a tire leak.

It is another object in addition to the foregoing object to identify the location of a leak without de-mounting the tire from a vehicle.

It is another object in addition to the foregoing objects to provide a visual means for detecting the location of a leak.

It is another object in addition to the foregoing objects to facilitate repairs of tires on the road.

It is another object in addition to the foregoing objects to reduce the time and labor for repairing a leaking tire.

BRIEF DESCRIPTION OF THE DRAWINGS

FIG. 1 is a perspective view showing a leak detecting apparatus connected to the inlet valve of a tire.

FIG. 2 is an enlarged diametral cross-sectional view taken through the inlet valve of a tire with the leak detecting apparatus connected to the inlet valve.

FIG. 3 is a perspective view of a fitting for connecting a flexible tube to the inlet valve of a tire.

FIG. 4 is a perspective view of an alternate embodiment of the fitting of FIG. 3 for connecting the flexible hose to the inlet valve of the tire.

FIG. 5 is an alternate embodiment of the leak detecting apparatus of FIG. 1.

DESCRIPTION OF THE PREFERRED EMBODIMENT

Referring now to the drawings wherein like numerals refer to like and corresponding parts throughout the several views, the leak detector apparatus 9 is shown in operation in FIGS. 1 and 2. In accordance with the present invention there is provided a powdered pigment 10 for forming an aerosol or semi-aerosol suspension 11 of a powdered pigment 10, a propellant 20 and air 38 inside a leaking tire 12. There is also provided a conventional aerosol can 15, for storing the powdered pigment 10 and a propellant 20, comprising a sealed portable container 17, a manually operable outlet valve 18 mounted in the top portion of the container 17 and a pick-up tube 19 communicating from said valve 18 to the bottom of said container 17.

A flexible tube 23 is provided for conveying the pigment/propellant mixture 26 of the aerosol can 15 from the outlet valve 18 to an inlet valve 25 of the tire 12. One end portion of the tube 23 is fixedly attached to the outlet portion of the container valve 18 by clamping or some other suitable means. The other end portion of the flexible tube 23 is provided with a suitable conventional type fitting 24 to connect the tube 23 to the tire inlet valve 25.

The conventional fitting 24 which is illustrated in FIG. 3 is commonly used for connecting the distal end portion of an inflation hose to a tire inlet valve. This type of fitting 24 has internal threads 29 which engage external threads 30 on the end portion of the tire valve 25.

FIG. 4 illustrates another suitable type of conventional fitting 28 which is easy to use and is also commonly used in bicycle pumps for connecting an inflation hose to a tire inlet valve. When used, the fitting 24 is placed over the tire valve 25 and the fitting lever 27 rotated to form a seal and open the tire valve 25. The fittings 24 and 28 illustrated in FIGS. 2 and 3 are but two types of available fittings. Means (not shown) are provided in the fittings 24 and 28 for sealing the connection of the flexible tube 23 to the tire inlet valve 25 and for opening the tire inlet valve 25 to admit the pigment/propellant mixture 26 into the tire 12. Obviously, any type of fitting which could connect and seal the flexible tube 23 to the tire valve 25 and open the valve 25 could be used.

The container 17 is charged with a two phase Freon propellant 20 or some other suitable propellant such as a hydrocarbon propellant. In the portable container 17, as oriented in the drawings, vapor phase 21 occupies the upper portion of the container 17 and liquid phase 22 occupies the lower portion. The particles of pigment 10 are dispersed in the liquid phase 22 forming the pigment/propellant mixture 26. Upon manually opening the outlet valve 18, the propellant 20 forces the dispersion of pigment 10 in the liquid propellant 22 up the pick-up tube 19 and through the valve 18 making the powdered pigment 10 available for injection into the tire 12.

Some of the pressurized pigment/propellant mixture 26 is released into the flexible tube 23 connected by the fitting 24 to the tire inlet valve 25. Expansion and evaporation of the liquid propellant phase 22 combined with the velocity of injection of the mixture 26 through the tire valve 25 disperses the pigment particles 10 to suspend the powdered pigment 10 in the air 38 of the tire 12 and the propellant 20 and form an aerosol or semi-aerosol suspension 11 throughout the interior of the tire 12.

Referring back to FIG. 1, the escape of the aerosol suspension 11 through the tire puncture 13 deposits some of the powdered pigment 10 onto the outer tire surface 14 around the perimeter of the puncture 13 causing a visible stain 31 for locating the puncture 13.

Several parameters determine how well the powdered pigment 10 will indicate the location of a leak 13. First the pigment 10 must be capable of adhering well enough to the outer surface 14 of the tire 12 to provide a visible marking 31 or staining on the perimeter of the leak 13. Secondly, the pigment 10 should be highly visible in order to minimize the amount of pigment 10 that must be transported through the leak 13 to be visible.

Since the rate of transport of the powdered pigment 10 through a leak 13 depends on the quantity of suspension 11 flowing through the leak 13, a more visible pigment 10 will develop a stain 31 more quickly and thereby be a more sensitive indicator of small leaks 13. Fluorescent type pigments 10 are especially attractive in this regard.

Thirdly, the powdered pigment 10 must be fine enough in size to form an aerosol or semi-aerosol suspension 11 so that escaping suspension 11 can transport particles of pigment 10 through the leak 13. Since a longer lived suspension 11 will improve the sensitivity to small leaks 13, a true aerosol suspension 11, i.e., less than one micron particle size, is highly desirable because the particles of pigment 10 would then stay suspended indefinitely. However, for most cases a semi-aerosol suspension 11 i.e., greater than one micron particle size, will have sufficient duration to indicate the location of the leak 13. Preferably, the particle size of the powder 10 should be under 10 microns.

One suitable available powdered pigment 10 is Dayglo (registered trademark) Series AX manufactured by the Dayglo Corporation. It is fluorescent and has been found to be effective for staining the outer tire surface 14. The pigment 10 is in the form of amorphous individual particles (not crystalline or agglomerate) having a rather small average particle size of 3.5–4.0 microns, which is advantageous for dispersion of the powder 10 both in the tire 12 and in the aerosol can 15. The particle size of the powder 10 can be further reduced, if desired, by processing in a roll or ball mill. Obviously, other powdered pigments 10 fulfilling the aforementioned requirements can also be used.

An alternative embodiment 32 of the invention is disclosed in FIG. 5, wherein an external source of compressed gas propellant, such as compressed air 38, is used in place of the pre-charged propellant 20 for mixing with the powdered pigment 10 and conveying the mixture to the interior of a tire 12. This embodiment 32 comprises, a pressure sustaining container 33, a closure 34 threadably connected to the upper portion of the container 33, an inlet fitting 35 mounted on the closure 34, a flexible line 36 fixedly connected to the inlet fitting 35 for admitting compressed air 38 into the container 33, a manually operated outlet valve 37 mounted on the closure 34 for releasing a mixture of air 38 and powdered pigment 10, a flexible tube 41 fixedly attached to the outlet valve 37 for transporting the mixture of air 38 and powdered pigment 10 to the interior of the tire 12 and a fitting 24 connected to one end portion of the outlet valve 37 for connecting the flexible outlet tube 41 to the inlet valve 25 of the tire 12.

The container 33 is initially charged by removing the closure 34 and filling the container 33 with only powdered pigment 10. The closure 34 is then sealed by threadably engaging the closure 34. Operation of the outlet valve 37 causes an inrush of compressed air into the container 33, entraining and dispersing the powdered pigment 10, and transporting the dispersion through the outlet valve 37, through the flexible outlet tube 41 and into the interior of the tire 12. In a similar manner as the first embodiment 9, the velocity and expansion of the air 38 forms an aerosol or semi-aerosol suspension 11 of powdered pigment 10 inside the tire 12.

From the foregoing it will be appreciated that the present invention provides an effective and convenient means for detecting the location of leaks in a tire which does not require de-mounting of a tire from a vehicle and is suitable for repairing tires on the road.

Although but two embodiments of my invention have been disclosed, it will be further appreciated that other embodiments can be provided by changes in material, shape, arrangement and detail of what has been disclosed without departing from the spirit and scope thereof as defined by the appended claims.

I claim:

1. A leak detector apparatus for detecting the location of a leak in a pneumatic tire comprising in combination:
   (a) a pressure sustaining container adapted for storing a powdered pigment and a propellant;
   (b) a propellant stored inside of said container for transporting the powdered pigment to the interior of a tire;
   (c) a powdered pigment stored inside of said container for visually indicating the location of a leak in said tire, said powdered pigment being of a material and a fine enough particle size to be transported by said propellant from the container to the interior of the tire, thence to combine with said propellant and air inside the tire to form a suspension of powdered pigment throughout the interior of the tire, and thence to flow through and stain the perimeter of a puncture in the tire to visually detect the location of a leak in the tire;
   (d) a means for regulating the discharge of said powdered pigment and propellant from said container; and
   (e) a means for conveying said powdered pigment and propellant from said container to the interior of said tire.

2. The leak detector apparatus recited in claim 1 wherein said powdered pigment is a fluorescent pigment.

3. The leak detector apparatus recited in claim 1 wherein said powdered pigment is of a fine enough particle size to form an aerosol suspension of powdered pigment throughout the interior of the tire.

4. The leak detector apparatus recited in claim 1 wherein said powdered pigment is of a fine enough particle size to form a semi-aerosol suspension of powdered pigment throughout the interior of the tire.

5. The leak detector apparatus recited in claim 1 wherein said propellant is a Freon propellant.

6. The leak detector apparatus recited in claim 1 wherein said propellant is a hydrocarbon propellant.

7. The pneumatic leak detector cited in claim 1 wherein the means for conveying the powdered pigment and propellant from the container to the interior of the tire comprises:
 (a) a flexible tube;
 (b) a fitting attached to one end portion of said tube for connecting said tube to an outlet of said container; and
 (c) a fitting attached to the other end portion of said tube for connecting said tube to an inlet valve of the tire, said fitting having a means for sealing the attachment of the tube to the inlet valve and a means for opening the tire inlet valve.

8. A leak detector apparatus for detecting the location of a leak in a pneumatic tire comprising in combination:
 (a) a pressure sustaining container for storing a powdered pigment;
 (b) a powdered pigment stored inside of said container for visually indicating the location of a leak in said tire, said powdered pigment being of a material and a fine enough particle size to be transported by a propellant from the container to the interior of the tire, thence to combine with said propellant and air inside the tire to form an aerosol suspension of powdered pigment throughout the interior of the tire, and thence to flow through and stain the perimeter of a puncture in the tire to visually detect the location of a leak in the tire;
 (c) a closure threadably connected to said container for adding said powdered pigment;
 (d) an inlet fitting mounted on said closure for admitting a propellant into said container;
 (e) a propellant for transporting the powdered pigment to the interior of a tire;
 (f) a manually operated outlet valve mounted on said closure for controlling the discharge of powdered pigment and propellant from said container;
 (g) a flexible tube for conveying said powdered pigment to said tire;
 (h) a fitting attached to one end portion of said tube for connecting said tube to the outlet valve mounted on said closure; and
 (i) a fitting attached to the other end portion of said tube for connecting said tube to an inlet valve of the tire, said fitting having a means for sealing the attachment of the tube to the inlet valve and a means for opening the tire inlet valve.

9. The leak detector apparatus recited in claim 8 wherein said propellant is a compressed gas.

* * * * *